J. T. WELCH.
FISHING REEL.
APPLICATION FILED MAY 23, 1921.
1,434,976. Patented Nov. 7, 1922.
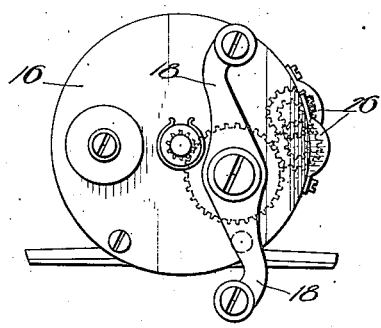
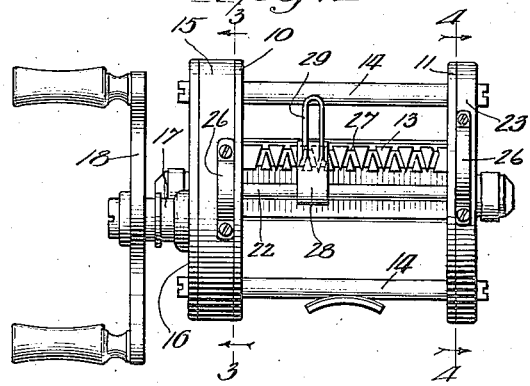
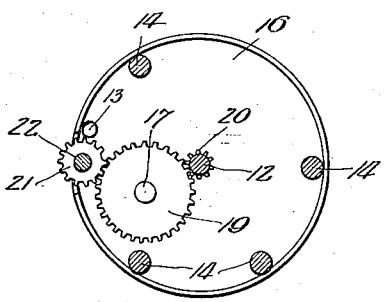
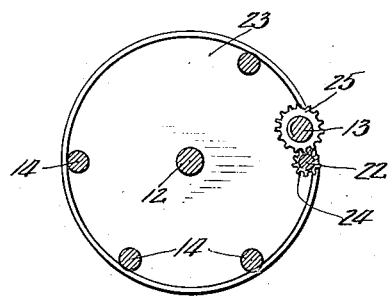
Inventor:
Jack T. Welch Patented Nov. 7, 1922.

1,434,976

UNITED STATES PATENT OFFICE.

JACK T. WELCH, OF DOWAGIAC, MICHIGAN, ASSIGNOR TO JAMES HEDDON'S SONS, A CORPORATION OF MICHIGAN.

FISHING REEL.

Application filed May 23, 1921. Serial No. 471,814.

*To all whom it may concern:*

Be it known that I, JACK T. WELCH, a citizen of the United States, residing at Dowagiac, in the county of Cass and State of Michigan, have invented certain new and useful Improvements in Fishing Reels, of which the following is a specification.

This invention relates to a fishing reel equipped with a level winding mechanism, and is concerned primarily with certain improvements in driving connections between the crank, spool, and traversing shafts, such as to ensure a minimum of wear, friction, and noise, and a maximum of dependability and service.

An exemplification of this invention is shown in the accompanying drawing in the manner following:

Figure 1 is an end elevation of a fishing reel;

Fig. 2 is a side elevation thereof; and

Figs. 3 and 4 are transverse sections therethrough taken respectively on lines 3—3 and 4—4 of Fig. 2.

The principal parts of my reel include a head plate 10 in spaced relation to a tail plate 11 between which are spool and traversing shafts 12 and 13, respectively, as well as the usual pillars 14. Associated with each head plate is a chamber within which are arranged certain of the driving connections which will now be described.

The chamber 15 adjacent the head plate 10 is provided with an end wall 16 forming a mounting for a crank shaft 17 which is equipped with an operating crank or handle 18. Secured to the crank shaft within the chamber is a pinion 19 that meshes with a smaller pinion 20 that is carried by the spool shaft, and with a third pinion 21 that is mounted upon a steady shaft 22 which extends lengthwise of the reel to present its opposite end within the chamber 23 adjacent the tail plate 11. From the description given it will be apparent that with rotation of the crank shaft both the spool and steady shafts 12 and 22 will be driven through the medium of the pinion 19. Upon the end of the steady shaft which lies within the chamber 23 is a pinion 24 in mesh with a pinion 25 that is carried on the proximate end of the traversing shaft. From this arrangement it results that the crank shaft also furnishes the drive for the traversing shaft through the medium of the connections just described.

It will be noted further that the steady and traversing shafts are located preferably adjacent one edge of the reel such that their pinions 21 and 25 may protrude slightly beyond the peripheral contour of the head and tail plates. In order that these parts may be completely housed I secure enclosing members 26 over such protruding pinions in the manner best shown in Figs. 1 and 2. The traversing shaft is formed with the usual reversely inclined threads 27 such as to co-operate with pawl mechanism (not shown) contained within a carriage 28 that is mounted for reciprocation upon the steady shaft. Projecting from the carriage is a guide 29 through which the line is adapted to pass as it is wound upon the usual spool mounted on the shaft 12.

According to the construction described, I am enabled by the use of very compact gearing to obtain a desired speed ratio for the respective shafts which are revolved. It is desirable, for instance, that the traversing shaft should rotate at approximately at the same speed as the crank shaft, but that the spool shaft should be revolved faster by three or four times. Such a speed ratio is obtained by the use of pinions which are related as shown in the drawings, where a ratio of approximately four to one exists between the pinions 19 and 20, a two to one ratio between the pinions 19 and 21, and a one to two ratio between the pinions 24 and 25. These speed ratios are, of course, merely suggestive, but represent to a considerable extent those which experience has demonstrated are very desirable for level wind fishing reels.

A further advantage results from the present construction in that the meshing pinions at each end of the reel are arranged in a single plane, it being unnecessary to overlap them and thus increase the size of the chamber, the complexity of forming the pinions, and the friction occasioned by their movement. It is furthermore unnecessary to project the traversing shaft into the chamber adjacent the head plate, or to extend the spool shaft beyond the tail plate 11 wherein it is journaled, since no pinion is carried by either shaft at the place mentioned. Owing to these features of construction, the parts may be readily assembled or disassembled, and are easily accessible for purposes of repair, cleaning, etc.

I claim:

1. In a fishing reel, the combination of two chambered end plates; spool, traversing, and steady shafts extending therebetween; a pinion on the spool shaft, a pinion on the steady shaft, and a third pinion in mesh with each of the other two, all within the same chamber; a crank shaft on which the third pinion is mounted; meshing pinions within the other reel chamber, one on the traversing shaft and the other on the steady shaft, adapted to complete the driving connections between all of said shafts; and a carriage slidingly mounted on the steady shaft having a driving connection with the traversing shaft such as to be reciprocated thereby lengthwise of the reel, substantially as described.

2. In a fishing reel, the combination of two chambered end plates; spool and traversing shafts arranged therebetween; a crank shaft mounted at one end of the reel; a pinion carried by the crank shaft within the proximate chamber; two other pinions in the same chamber in mesh therewith, one of which is secured to the spool shaft; a connecting shaft to which the other pinion is secured and extending lengthwise of the reel into the chamber at its opposite end; a pinion in the last named chamber carried by the connecting shaft, and another pinion in mesh therewith carried by the traversing shaft; and means mounted for reciprocation lengthwise of the reel having a driving connection with the traversing shaft, substantially as described.

3. In a fishing reel, the combination of two chambered end plates; spool and traversing shafts extending therebetween and each provided with one pinion which lies in a chamber remote from the other; a driving connection between said pinions including a connecting shaft extending lengthwise of the reel, a pinion mounted thereon in mesh with the traversing shaft pinion at one end, a second pinion mounted on the connecting shaft and disposed within the same chamber wherein the spool pinion is disposed, and a crank shaft having a pinion within the last named chamber in mesh with the two other pinions therein to complete a driving connection between all of the said shafts; and means operable by movement of the traversing shaft for guiding a line in its winding movements upon the reel, substantially as described.

4. In a fishing reel, the combination of two chambered end plates; three shafts extending therebetween one for a spool, another for a line traverser, and the third for a driving connection between the other two; a crank shaft mounted on one end of the reel; and means connecting all of the shafts including three pinions arranged within the chamber that is adjacent the crank shaft, one of largest diameter mounted upon the crank shaft, another of lesser diameter mounted on the connecting shaft, and a third of smallest diameter mounted on the spool shaft; and two other pinions in mesh with each other arranged within the chamber at the opposite end of the reel, one on the connecting shaft, and the other on the traversing shaft, the former smaller than the latter, whereby the crank and traversing shafts are rotated at substantially even speeds but considerably faster than the spool shaft, substantially as described.

5. In a fishing reel having a spool, the combination with a reversely threaded traversing shaft of a line guide carriage adapted to be reciprocated thereby, a rotatable shaft on which the carriage is slidably mounted, and means, including the rotatable shaft, for revolving the traversing shaft, to thereby reciprocate the carriage, substantially as described.

6. In a fishing reel having a spool, the combination with a reversely threaded traversing shaft of a line guide carriage adapted to be reciprocated thereby, a rotatable shaft on which the carriage is slidably mounted, and driving means including the rotatable shaft connecting the spool and traversing shaft, substantially as described.

JACK T. WELCH.

Witness:
L. J. WOOSTER,